United States Patent
Engel et al.

(10) Patent No.: US 8,264,485 B2
(45) Date of Patent: Sep. 11, 2012

(54) METHOD AND APPARATUS FOR VISUALIZING 3D IMAGE DATA FROM TOMOGRAPHIC IMAGING MODALITIES

(75) Inventors: Klaus Engel, Nürnberg (DE); Stefan Röttger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 754 days.

(21) Appl. No.: 12/318,808

(22) Filed: Jan. 8, 2009

(65) Prior Publication Data
US 2009/0189889 A1 Jul. 30, 2009

(30) Foreign Application Priority Data
Jan. 10, 2008 (DE) .................... 10 2008 003 878

(51) Int. Cl.
*G06T 15/00* (2006.01)
(52) U.S. Cl. ....................................... 345/419
(58) Field of Classification Search .................. 345/424, 345/419, 425, 426
See application file for complete search history.

(56) References Cited

U.S. PATENT DOCUMENTS

| | | | |
|---|---|---|---|
| 6,532,017 B1 | 3/2003 | Burgess | |
| 7,148,887 B2 * | 12/2006 | Kaufman et al. | 345/419 |
| 7,218,323 B1 * | 5/2007 | Halmshaw et al. | 345/424 |
| 7,773,086 B2 * | 8/2010 | Li et al. | 345/420 |
| 7,961,187 B2 * | 6/2011 | Borland et al. | 345/424 |
| 2002/0193687 A1 * | 12/2002 | Vining et al. | 600/425 |
| 2007/0103464 A1 * | 5/2007 | Kaufman et al. | 345/424 |
| 2007/0236496 A1 | 10/2007 | Bahadur | |
| 2009/0103793 A1 * | 4/2009 | Borland et al. | 382/131 |
| 2011/0118596 A1 * | 5/2011 | Vining et al. | 600/425 |

OTHER PUBLICATIONS

Christof Rezk-Salama and Andreas Kolb "Opacity Peeling for Direct Volume Rendering" Eurographics 2006, vol. 25 (2006) Nr. 3; Others.

\* cited by examiner

*Primary Examiner* — Hau Nguyen
*Assistant Examiner* — Leon T Cain, II
(74) *Attorney, Agent, or Firm* — Harness, Dickey & Pierce, P.L.C.

(57) ABSTRACT

At least one embodiment of the present invention relates to a method and an apparatus for visualizing 3D image data from tomographic imaging modalities using a rendering technique in which every pixel is calculated by integrating or summing along respectively one ray through a volume surrounded by the 3D image data. In the method, a peeling function is additionally introduced into the integration or summation, by which, in the integration or summation, the 3D image data on the respective ray only contributes with its full data value to reducing the optical transparency beyond a prescribable value of an optical skin depth. The peeling function is selected such that, in a transition region before the prescribable value of the optical skin depth is reached, the 3D image data on the ray still contributes to reducing the optical transparency with a fraction of its full data value such that there is a smooth profile, generated by the peeling function, when an outer layer is peeled off. The method and the associated apparatus make it possible to avoid image artifacts such as pixel flickering during volume visualization.

12 Claims, 1 Drawing Sheet

METHOD AND APPARATUS FOR VISUALIZING 3D IMAGE DATA FROM TOMOGRAPHIC IMAGING MODALITIES

PRIORITY STATEMENT

The present application hereby claims priority under 35 U.S.C. §119 on German patent application number DE 10 2008 003 878.4 filed Jan. 10, 2008, the entire contents of which is hereby incorporated herein by reference.

FIELD

Embodiments of the present invention generally relate to a method and/or an apparatus for visualizing 3D image data from tomographic imaging modalities using a rendering technique in which every pixel is calculated by integrating or summing along respectively one ray through a volume surrounded by the 3D image data.

BACKGROUND

It is a technique for visualizing volumes, in which volume data, obtained by computed tomography (CT) or magnetic resonance imaging (MRI) for example, can be displayed on a screen. Known examples of such visualization techniques are known by the terms "volume rendering technique" (VRT) or "gradient magnitude rendering". The 3D image data, present as a matrix of scalar values, must be assigned optical properties in these rendering techniques. This is effected by a suitable choice of transfer function, which takes into account optical absorption and emission in the volume to be displayed. This transfer function can also determine which parts of the volume to be displayed are displayed opaquely, semi-transparently or transparently in the image. Furthermore, specific colors can be assigned to individual voxels by way of this transfer function.

When displaying 3D volume data records from tomographic imaging modalities, in particular MRI or CT image data records, using a volume rendering technique, it is possible for structures of interest lying on the inside to be covered by regions, such as bones, lying on the outside. For example, the cranial bones cover the brain structures in MRI images. Although certain regions can be made transparent by manipulating the transfer function, this can hardly be achieved in a satisfactory fashion in the case of MRI images of the head because in the 3D image data the cranial bones have very similar intensity values to the brain structures. It is for this reason that clipping techniques are often used in this case, in which the cranial bones have to be segmented laboriously so that they can subsequently be masked.

A further technique for visualizing 3D image data from tomographic imaging modalities using a rendering technique is disclosed in Ch. Rezk-Salama et al., "Opacity Peeling for Direct Volume Rendering", in: Computer Graphics Forum (Proc. Eurographics), vol. 25, issue 3, pages 597 to 606, 2006, the entire contents of which are incorporated herein by reference. In the method disclosed therein, a peeling technique is used in which outer, non-transparent layers of the displayed volume can be peeled off or made transparent. The method uses the known ray-casting algorithm, in which each image pixel is calculated by integrating or summing along a ray from the eye of the observer through the volume surrounding the 3D image data. In this case, the sum or integral includes the corresponding transfer function with an emission and/or absorption component. Hence, the transparencies of the individual voxels along the ray are summed. When calculating the individual pixels by starting from the eye of the observer, i.e. in so-called front-to-back composition, a threshold for the optical depth is set. All contributions of the 3D image data to the transparency are set to zero until the threshold value is reached. This makes it possible to peel off or mask an outer layer region of the volume having a constant optical depth which would otherwise cover inner regions. This technique is also referred to as opacity peeling.

However, very thin layers with a high transparency, which remain after the layer has been peeled off, can lead to a distracting pixel flickering of the rendered image data in the utilized pixel shader in this threshold technique.

U.S. Pat. No. 6,532,017 B1 discusses a volume rendering pipeline comprising a single integrated circuit which is intended to ensure cost-effective volume visualization in real time. This document also discloses a ray-casting technique combined with a transfer function for visualizing the 3D image data. The transfer function assigns colors and transparencies to the individual data values in a conventional manner.

US 2007/0236496 A1 describes a graphic art display method for CT images, in which techniques such as duplication, symmetry inversion, contrast inversion, superposition of a number of images or deformation of the image contents, if need be combined with coloring, are applied to obtain a graphic art display.

SUMMARY

In at least one embodiment of the present invention, a method is specified for visualizing 3D image data from tomographic imaging modalities using a rendering technique which makes it possible to peel off layers of distracting layers of material without at least one of the disadvantages mentioned above.

In the proposed method, the utilized rendering technique calculates every pixel by integrating or summing along respectively one ray originating from the eye of the observer through the volume surrounded by the 3D image data in a known manner. This corresponds to the known ray-casting technique. At least one embodiment of the method distinguishes itself by virtue of the fact that a continuous peeling function is additionally introduced into the integration or summation as an integrand or summand, by means of which, in the integration or summation, the 3D image data on the respective ray in the case of front-to-back composition only contributes with its full data value to reducing the optical transparency beyond a prescribable value of the optical skin depth. In this case, the peeling function is selected such that, in a transition region before this skin depth is reached, the 3D image data on the ray only contributes to reducing the optical transparency with an increasing fraction, in the direction of the ray, of its full data value such that a smooth profile of the peeling off is generated. In this case, the transition region can extend over the entire integration or summation region before reaching the skin depth, or only over part of this region, with the values of the 3D image data being set to zero in the remaining part, i.e. made completely transparent.

The apparatus designed to carry out at least one embodiment of the method has at least one storage unit for the 3D image data and a computational unit which is setup accordingly to carry out at least one embodiment of the method.

At least one embodiment of the method makes it possible to selectively peel off material obscuring the view so as to visualize the 3D image data. At least one embodiment of the method is comparable to sandblasting, with the prescribable skin depth setting how much material is peeled off in total.

Softer material, in this case corresponding to material with a higher transparency, is eroded more strongly than harder material, in this case corresponding to material with a lower transparency.

By adapting the corresponding transfer function, the hardness of the respective material (in this sense) can additionally be set via its optical density in order to influence the process of peeling off, also referred to as erosion in the following text. For example, if the hardness of the cranial bones is artificially set to have a very low degree of hardness, the brain is automatically exposed.

At least one embodiment of the method and the associated apparatus also make interactive control, in which the skin depth can be changed interactively for every possible observer point of view, possible and the resultant image can be calculated and displayed in real time. Thus, the user may vary or set the skin depth, and hence the peeling-off depth, based on the display in order to satisfy the requirements.

At least one embodiment of the method and the associated apparatus make it possible to avoid rendering artifacts at the layer boundaries because the peeling function does not generate a hard boundary but a continuous, smooth layer transition. Both the value for the skin depth and the parameter of the peeling function used for the smooth layer transition can be set interactively. Overall, this is achieved by continuous recasting of the beam integral or the summation.

In an advantageous refinement, the peeling function PF(d) is selected as a function of the optical skin depth d(l) such that $PF(d)=\min(d/c; 1)^{1/e}$, wherein c corresponds to the prescribable value of the optical skin depth and e corresponds to a prescribable value generating a smooth profile. At least one embodiment of the method can be applied to different rendering techniques which use a beam integral or a corresponding summation, in particular to the volume rendering technique or the gradient magnitude rendering technique.

Particularly advantageous fields of application of the method relate to medicine technology, in particular to visualizing 3D image data from computed tomography or magnetic resonance imaging. Hence, at least one embodiment of the method and the apparatus afford the possibility of particularly good visualizations of image records of the brain or else of tumors such as a breast tumor, for example. A further field of application relates to screening luggage at airports, for example. At least one embodiment of the proposed method affords the possibility of improved visualization of the contents of a piece of luggage and keeping the most details compared to other known methods such as the peeling method by using a threshold value described in the introduction of the description.

An advantageous possibility for visualizing 3D image data is to use the computational unit to automatically increase (continuously or in prescribable steps) the prescribable value of the optical skin depth during the imaging. In this case, the observer is shown an image sequence or a changing image, in which deeper and deeper lying details of the volume become identifiable. Preferably, the observer may from time to time stop (and subsequently continue) the image sequence or the changing image, or the automatic change of the prescribable value of the skin depth, during imaging so as to be able to analyze specific images in more detail.

BRIEF DESCRIPTION OF THE DRAWINGS

The proposed method will be explained again in more detail in the following text on the basis of an example embodiment with reference to the drawings, in which.

DETAILED DESCRIPTION OF THE EXAMPLE EMBODIMENTS

Figure 1:
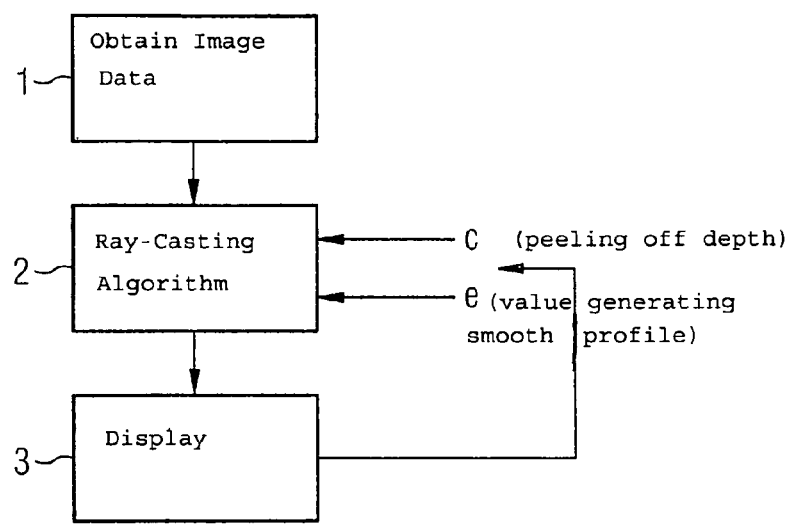
FIG. 1 shows a schematic illustration of the procedure of an example embodiment of the proposed method.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to, distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The ray-casting algorithm used in this case will firstly be explained again in more detail in order to describe an example embodiment of the proposed method. In this context, beams are drawn as a function of the resolution through the volume to be illustrated, starting from eye of the observer, with respectively all voxels lying on the respective ray contributing with their data value to a sum or an integral over the beam. Let $r(l)=ep+l \cdot vd$ be a beam through the volume, with ep being the eye position, vd the line of sight and l the viewing distance, by means of which the beam is parameterized. Furthermore, let $s(l)$ be the scalar value of the observed volume at the corresponding position $r(l)$ on the beam. Moreover, let $TF_e(s)$ be the emission component of the transfer function and let $TF_a(s)$ be the absorption component of the transfer function, that is to say the relative absorption coefficient.

$$d(l) = \int_0^l TF_a(s(x))\,dx$$

is the optical depth at the distance l along the beam. Furthermore, $t(l)=e^{-a \cdot d(l)}$ is the accumulated transparency at the distance l along the beam with a being the global absorption coefficient. This results in the beam integral $$\int_0^\infty TF_e(s(l))t(l)\,dl.$$

The discretization of this integral leads to the step-by-step formulation used in most front-to-back realizations of a ray-caster. In the case of a precalculated α, the following pseudo-code shows the ray-casting process for a sequence of m scanned scalar values $s_n$:

$l_0=0$ $I_0=(0,0,0)$ for each n=0 . . . m do $l_{n+1}=l_n+TF_a(s_n)$ $I_{n+1}=I_n+TF_e(s_n) \cdot TF_a(s_n) \cdot \exp(-a \cdot l_n)$ output color $I_m$ In the case of the opacity peeling technique by Rezk-Salama et al., described in the introduction of the description, the entire contents of which are incorporated herein by reference, the opacity accumulated by way of the above calculation would be checked at each step and set to zero if a threshold value was attained. However, this threshold technique causes the previously mentioned pixel flickering. In accordance with the proposed method and in order to avoid this pixel flickering, a peeling function is introduced which generates a smooth transition in the case of peeling off.

This peeling function PF(d) specifies the reduction in opacity as a function of the optical depth d(l). In this context, PF(d)=1 means that no material is peeled off. PF(d)=$step_c$(d) would mean that all material is peeled off until an optical depth c is attained. Let $$PPF(d) = \int_0^d PF(x)\,dx$$

be the pre-integrated peeling function. Let $d_p(l)=PPF(d(l))$ be the peeled-off optical depth, and $t_p(l)=e^{-a \cdot d_p(l)}$ be the peeled-off transparency at the distance l along the beam. Then $$\int_0^\infty PF(d(l))TF_e(s(l))t_p(l)\,dl$$

is the peeled-off beam integral. It can be seen from this that not only the absorption but also the emission is reduced by the peeling function since the peeled-off regions do not contribute to the emission.

Instead of specifying a hard threshold value, an embodiment of the proposed method selects a peeling function which generates a smooth degradation of the peeled-off layers. To this end, PF(d)=min(d/c; 1)$^{1/e}$ is selected in the present example, in which c specifies the desired peeling off depth of the smooth erosion, and e specifies a parameter corresponding to the smoothness of the boundary layers of the peeled-off region. The corresponding pseudo-code then reads as follows:

$l_0=0$ $I_0=(0,0,0)$ for each n=0 . . . m do $l_{n+1}=l_n+TF_a(s_n)$ $I_{n+1}=I_n+TF_e(s_n) \cdot TF_a(s_n) \cdot PF(l_n) \cdot \exp(-a \cdot PPF(l_n))$ output color $I_m$ An embodiment of the proposed method can also be used for the gradient magnitude rendering technique in addition to the volume rendering technique used above. In this case, only the following modification is applied to the pseudo-code:

$$l_{n+1} = l_n + TF_a(s_n) \cdot \text{gradmag}(x_n)$$

$$I_{n+1} = I_n + TF_e(s_n) \cdot TF_a(s_n) \cdot PF(l_n) \cdot \exp(-a \cdot PPF(l_n)) \cdot \text{gradmag}(x_n)$$

FIG. 1 shows, in an example manner, the procedure when carrying out an embodiment of the proposed method. In this procedure, the intended skin depth c and the parameter e for determining the smoothness of the transition are prescribed in the ray-casting algorithm 2 (described above) and applied to the 3D image data 1. The image generated in this fashion is then displayed on a monitor 3. The user can now interactively change both the skin depth c and the parameter e, so that step 2 can be carried out anew with new parameters, and the result can in turn be displayed on the monitor 3. This makes it possible to interactively adapt the desired display, or to generate a visualization by constantly changing the parameters in which the user moves through the outer regions and into the inner region of the volume illustrated by the 3D image data.

Figure 2:
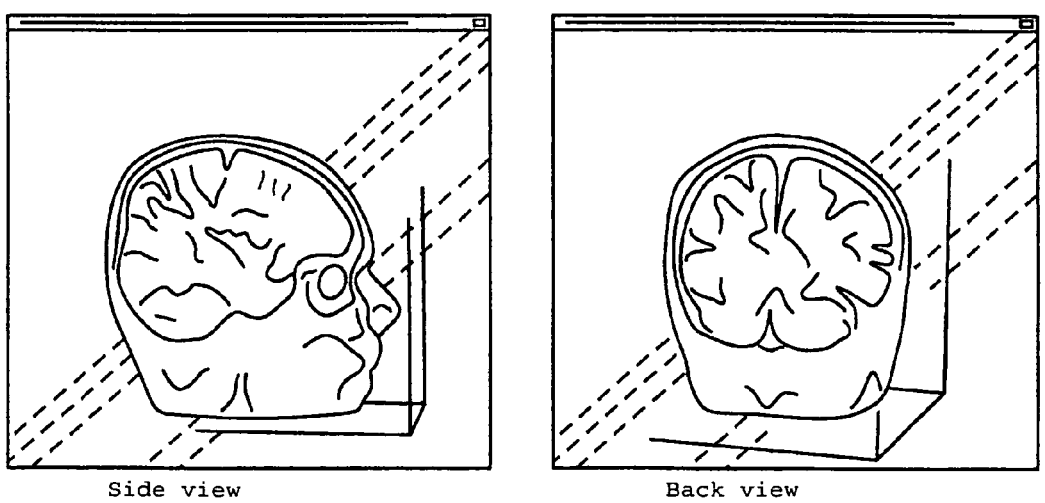
FIG. 2 shows an example of an illustration of the 3D image data after a layer has been peeled off in accordance with an example embodiment of the proposed method.

FIG. 2 shows an example of imaging the 3D image data of an image of the head of a patient, recorded by an MRI, in a side view and a back view. In this illustration, the outermost layer containing the cranial bones was smoothly peeled off in accordance with an embodiment of the proposed method.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to Floppy Disks™, cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for visualizing 3D image data from tomographic imaging modalities using a rendering technique in which every pixel is calculated by integrating or summing along respectively one ray through a volume surrounded by the 3D image data, the method comprising:

additionally introducing a peeling function into the integration or summation, by which, in the integration or summation, the 3D image data on a respective ray only contributes with its full data value to reducing the optical transparency beyond a value of an optical skin depth; and selecting the peeling function such that, in a transition region before the value of the optical skin depth is reached, the 3D image data on the ray still contributes to reducing the optical transparency with a fraction of its full data value such that there is a smooth profile, generated by the peeling function, when an outer layer is peeled off, the optical skin depth being $$d(l) = \int_0^l TF_a(s(x))\,dx,$$

wherein $TF_a(s(x))$ is an absorption component of a transfer function for visualizing the 3D image data.

2. A method for visualizing 3D image data from tomographic imaging modalities using a rendering technique in which every pixel is calculated by integrating or summing along respectively one ray through a volume surrounded by the 3D image data, the method comprising:

additionally introducing a peeling function into the integration or summation, by which, in the integration or summation, the 3D image data on a respective ray only contributes with its full data value to reducing the optical transparency beyond a value of an optical skin depth; and selecting the peeling function such that, in a transition region before the value of the optical skin depth is reached, the 3D image data on the ray still contributes to reducing the optical transparency with a fraction of its full data value such that there is a smooth profile, generated by the peeling function, when an outer layer is peeled off, wherein the peeling function PF(d) is selected as a function of the optical skin depth d(l) such that $PF(d) = \min(d/c; 1)^{1/e}$, wherein c is the peeling off depth and e corresponds to a value generating a smooth profile.

3. The method as claimed in claim 1, wherein a volume rendering technique is used.

4. The method as claimed in claim 1, wherein a gradient magnitude rendering technique is used.

5. An apparatus for visualizing 3D image data from tomographic imaging modalities using a rendering technique in which every pixel is calculated by integrating or summing along respectively one ray through a volume surrounded by the 3D image data, comprising:

a storage device to store the 3D image data; and a computational unit to carry out the integration or summation, wherein the computational unit is designed to additionally include a peeling function in the integration or summation, by which, in the integration or summation, the 3D image data on a respective ray only contributes with its full data value to reducing the optical transparency beyond a value of an optical skin depth, wherein the peeling function is selected such that, in a transition region before the value of the optical skin depth is reached, the 3D image data on the ray still contributes to reducing the optical transparency with a fraction of its full data value such that there is a smooth profile, generated by the peeling function, when an outer layer is peeled off, the optical skin depth being $$d(l) = \int_0^l TF_a(s(x))dx,$$

wherein $TF_a(s)$ is an absorption component of a transfer function for visualizing the 3D image data.

6. The apparatus as claimed in claim 5, wherein the peeling function PF(d) is selected as a function of the optical skin depth d(l) such that $PF(d)=\min(d/c; 1)^{1/e}$, wherein c is the peeling off depth and e corresponds to a value generating a smooth profile.

7. The apparatus as claimed in claim 5, wherein a volume rendering technique is used.

8. The apparatus as claimed in claim 5, wherein a gradient magnitude rendering technique is used.

9. The apparatus as claimed in claim 6, wherein a volume rendering technique is used.

10. The apparatus as claimed in claim 6, wherein a gradient magnitude rendering technique is used.

11. The method as claimed in claim 2, wherein a volume rendering technique is used.

12. The method as claimed in claim 2, wherein a gradient magnitude rendering technique is used.

* * * * *